US012641471B2

(12) United States Patent
Pries et al.

(10) Patent No.: US 12,641,471 B2
(45) Date of Patent: May 26, 2026

(54) APPARATUS, METHOD, AND COMPUTER PROGRAM FOR PROVIDING SERVICE LEVEL FOR EXTENDED REALITY APPLICATION

(71) Applicant: Nokia Technologies Oy, Espoo (FI)

(72) Inventors: Rastin Pries, Augsburg (DE); Stefano Paris, Vanves (FR); Devaki Chandramouli, Plano, TX (US); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 418 days.

(21) Appl. No.: 18/250,445

(22) PCT Filed: Oct. 26, 2020

(86) PCT No.: PCT/EP2020/079984
§ 371 (c)(1),
(2) Date: Apr. 25, 2023

(87) PCT Pub. No.: WO2022/089713
PCT Pub. Date: May 5, 2022

(65) Prior Publication Data
US 2023/0403596 A1 Dec. 14, 2023

(51) Int. Cl.
*H04W 28/02* (2009.01)
*H04L 67/131* (2022.01)
*H04W 4/30* (2018.01)
*H04W 28/24* (2009.01)

(52) U.S. Cl.
CPC ....... *H04W 28/0221* (2013.01); *H04L 67/131* (2022.05); *H04W 4/30* (2018.02); *H04W 28/0226* (2013.01); *H04W 28/0231* (2013.01); *H04W 28/24* (2013.01)

(58) Field of Classification Search
CPC .............. H04W 28/0221; H04W 4/30; H04W 28/0226; H04W 28/0231; H04W 28/24; H04L 67/131
See application file for complete search history.

(56) References Cited

U.S. PATENT DOCUMENTS

| | | | |
|---|---|---|---|
| 2019/0372837 A1* | 12/2019 | Yang ................... | H04L 41/0806 |
| 2021/0274235 A1* | 9/2021 | Anderegg .......... | H04N 21/6581 |
| 2022/0086249 A1* | 3/2022 | Parvataneni ........... | H04L 67/10 |
| 2023/0148189 A1* | 5/2023 | Lee ....................... | H04W 76/28 455/456.1 |

FOREIGN PATENT DOCUMENTS

| | | | | |
|---|---|---|---|---|
| WO | WO-2019126931 A1 * | 7/2019 | .......... | H04W 72/543 |
| WO | WO-2021158313 A1 * | 8/2021 | ............. | G06N 3/045 |

* cited by examiner

Primary Examiner — Mehmood B. Khan
(74) Attorney, Agent, or Firm — Carter, DeLuca & Farrell LLP

(57) ABSTRACT

The disclosure relates to an apparatus comprising means for: receiving (900), from a terminal, a request for a service level of an extended reality application, wherein the request includes an indication of a terminal capability and/or terminal preference; determining (902) a service level based on the terminal capability and/or the terminal preference; and sending (904), to the terminal, a response to the request for a service level, wherein the service level indicates that extended reality application processing is to be performed by the terminal, by the apparatus or split between the terminal and the apparatus.

1 Claim, 11 Drawing Sheets

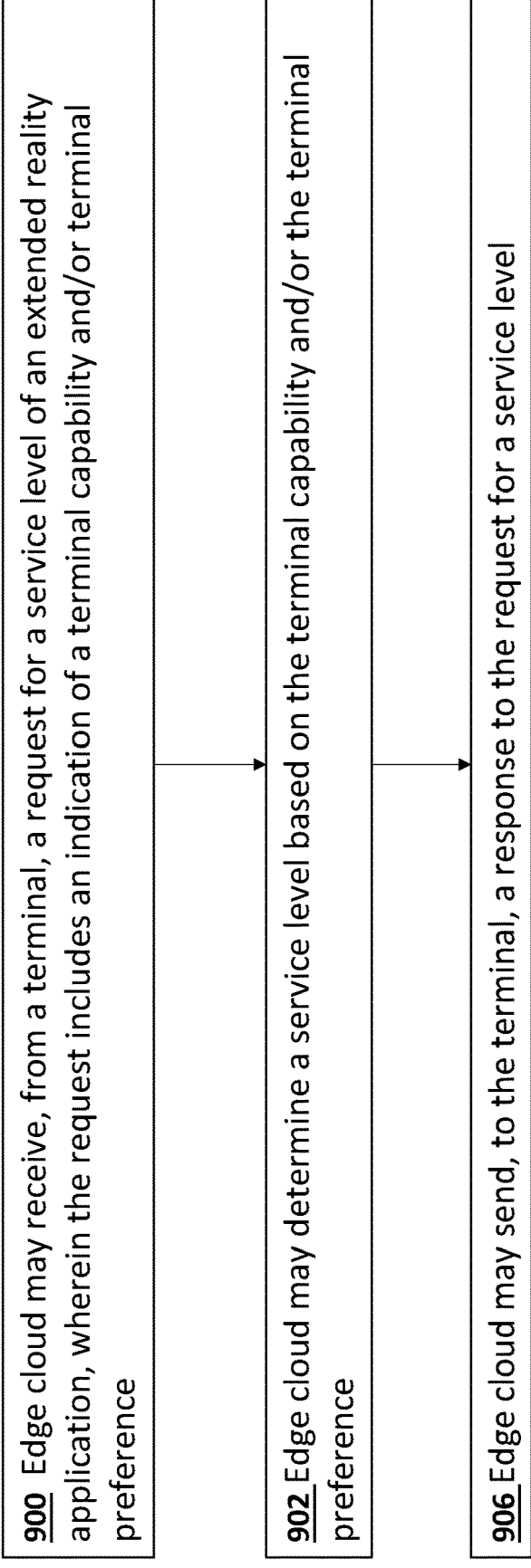

900 Edge cloud may receive, from a terminal, a request for a service level of an extended reality application, wherein the request includes an indication of a terminal capability and/or terminal preference

902 Edge cloud may determine a service level based on the terminal capability and/or the terminal preference

906 Edge cloud may send, to the terminal, a response to the request for a service level

Fig. 9

1000 Terminal may send, to an edge cloud, a request for a service level of an extended reality application, wherein the request includes an indication of an edge cloud capability and/or terminal preference

1002 Terminal may receive, from the edge cloud, a response to the request for a service level

APPARATUS, METHOD, AND COMPUTER PROGRAM FOR PROVIDING SERVICE LEVEL FOR EXTENDED REALITY APPLICATION

RELATED APPLICATION

This application was originally filed as PCT Application No. PCT/EP2020/079984, filed on Oct. 26, 2020, which is incorporated herein by reference in its entirety.

FIELD OF THE DISCLOSURE

The present disclosure relates to an apparatus, a method, and a computer program for rendering an extended reality application in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a base station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising means for: receiving, from a terminal, a request for a service level of an extended reality application, wherein the request includes an indication of a terminal capability and/or terminal preference; determining a service level based on the terminal capability and/or the terminal preference; and sending, to the terminal, a response to the request for a service level, wherein the service level indicates that extended reality application processing is to be performed by the terminal, by the apparatus or split between the terminal and the apparatus.

The terminal capability may comprise a processing capability and/or a power capability; and/or the terminal preference may comprise that extended reality application processing is to be performed by the terminal, by the apparatus or split between the terminal and the apparatus.

The apparatus may comprise means for: determining the service level based on an apparatus capability and/or apparatus preference.

Determining the service level may be further based on network conditions, wherein the network conditions comprise at least one of channel quality, delay, outages, queueing status.

The apparatus capability may comprises a processing capability; and/or the apparatus preference may comprise that extended reality application processing is to be performed by the terminal, by the apparatus or split between the terminal and the apparatus.

The apparatus may comprise means for: receiving, from the terminal, a request to indicate whether the apparatus has a subscription capability to subscribe to terminal location notifications from an access and mobility management function; and sending, to the terminal, a response including an indication that the apparatus has a subscription capability to subscribe to terminal location notifications from the access and mobility management function.

The apparatus may comprise means for: subscribing to terminal location notifications from an access and mobility management function; and sending, to the terminal, a message including an indication that the apparatus subscribed to terminal location notifications from the access and mobility management function.

The apparatus may comprise means for: receiving, from the terminal, a request to modify the service level, wherein the request includes at least one changed terminal capability and/or terminal preference or changed network conditions.

The request to modify the service level may include a suggestion from the terminal to modify the service level.

The apparatus may comprise means for: sending, to the terminal, a response to the request to modify the service level, wherein the response includes an indication that the suggestion from the terminal to modify the service level has been accepted or refused.

The response to the request to modify the service level may include an alternative suggestion from the apparatus to modify the service level different from the suggestion from the terminal.

The apparatus may comprise means for: performing at least one of: determining that the apparatus capability and/or apparatus preference has changed; determining that network conditions has changed; and/or receiving, from an access and mobility management function, a terminal location notification.

The apparatus may comprise means for: sending, to the terminal, a request to modify the service level.

The request to modify the service level may be sent when at least one of the apparatus capability and/or apparatus preference has changed, network conditions has changed or a terminal location notification is received.

The request to modify the service level may include the changed apparatus capability and/or preference or changed network conditions; and/or the request to modify the service level may include a suggestion from the apparatus to modify the service level.

The apparatus may comprise means for: receiving, from the terminal, a response to the request to modify the service level, wherein the response to the request to modify the service level includes an indication that the suggestion from the apparatus to modify the service level has been accepted or refused.

The response to the request to modify the service level may include an alternative suggestion from the terminal to modify the service level different from the suggestion from the apparatus.

Extended reality application processing may comprise at least one of rendering, pose tracking, foreground/background segmentation or stitching.

According to an aspect there is provided an apparatus comprising at least one processor and at least one memory including computer code for one or more programs, the at least one memory and the computer code configured, with the at least one processor, to cause the apparatus at least to: receive, from a terminal, a request for a service level of an extended reality application, wherein the request includes an indication of a terminal capability and/or terminal preference; determine a service level based on the terminal capability and/or the terminal preference; and send, to the terminal, a response to the request for a service level, wherein the service level indicates that extended reality application processing is to be performed by the terminal, by the apparatus or split between the terminal and the apparatus.

The terminal capability may comprise a processing capability and/or a power capability; and/or the terminal preference may comprise that extended reality application processing is to be performed by the terminal, by the apparatus or split between the terminal and the apparatus.

The at least one memory and the computer code may be configured, with the at least one processor, to cause the apparatus at least to: determine the service level based on an apparatus capability and/or apparatus preference.

Determining the service level may be further based on network conditions, wherein the network conditions comprise at least one of channel quality, delay, outages, queueing status.

The apparatus capability may comprises a processing capability; and/or the apparatus preference may comprise that extended reality application processing is to be performed by the terminal, by the apparatus or split between the terminal and the apparatus.

The at least one memory and the computer code may be configured, with the at least one processor, to cause the apparatus at least to: receive, from the terminal, a request to indicate whether the apparatus has a subscription capability to subscribe to terminal location notifications from an access and mobility management function; and send, to the terminal, a response including an indication that the apparatus has a subscription capability to subscribe to terminal location notifications from the access and mobility management function.

The at least one memory and the computer code may be configured, with the at least one processor, to cause the apparatus at least to: subscribe to terminal location notifications from an access and mobility management function; and send, to the terminal, a message including an indication that the apparatus subscribed to terminal location notifications from the access and mobility management function.

The at least one memory and the computer code may be configured, with the at least one processor, to cause the apparatus at least to: receive, from the terminal, a request to modify the service level, wherein the request includes at least one changed terminal capability and/or terminal preference or changed network conditions.

The request to modify the service level may include a suggestion from the terminal to modify the service level.

The at least one memory and the computer code may be configured, with the at least one processor, to cause the apparatus at least to: send, to the terminal, a response to the request to modify the service level, wherein the response includes an indication that the suggestion from the terminal to modify the service level has been accepted or refused.

The response to the request to modify the service level may include an alternative suggestion from the apparatus to modify the service level different from the suggestion from the terminal.

The at least one memory and the computer code may be configured, with the at least one processor, to cause the apparatus at least to: perform at least one of: determining that the apparatus capability and/or apparatus preference has changed; determining that network conditions has changed; and/or receiving, from an access and mobility management function, a terminal location notification.

The at least one memory and the computer code may be configured, with the at least one processor, to cause the apparatus at least to: send, to the terminal, a request to modify the service level.

The request to modify the service level may be sent when at least one of the apparatus capability and/or apparatus preference has changed, network conditions has changed or a terminal location notification is received.

The request to modify the service level may include the changed apparatus capability and/or preference or changed network conditions; and/or the request to modify the service level may include a suggestion from the apparatus to modify the service level.

The at least one memory and the computer code may be configured, with the at least one processor, to cause the apparatus at least to: receive, from the terminal, a response to the request to modify the service level, wherein the response to the request to modify the service level includes an indication that the suggestion from the apparatus to modify the service level has been accepted or refused.

The response to the request to modify the service level may include an alternative suggestion from the terminal to modify the service level different from the suggestion from the apparatus.

Extended reality application processing may comprise at least one of rendering, pose tracking, foreground/background segmentation or stitching.

According to an aspect there is provided an apparatus comprising circuitry configured to: receive, from a terminal, a request for a service level of an extended reality application, wherein the request includes an indication of a terminal capability and/or terminal preference; determine a service level based on the terminal capability and/or the terminal preference; and send, to the terminal, a response to the request for a service level, wherein the service level indicates that extended reality application processing is to be performed by the terminal, by the apparatus or split between the terminal and the apparatus.

The terminal capability may comprise a processing capability and/or a power capability; and/or the terminal preference may comprise that extended reality application processing is to be performed by the terminal, by the apparatus or split between the terminal and the apparatus.

The apparatus may comprise circuitry configured to: determine the service level based on an apparatus capability and/or apparatus preference.

Determining the service level may be further based on network conditions, wherein the network conditions comprise at least one of channel quality, delay, outages, queueing status.

The apparatus capability may comprises a processing capability; and/or the apparatus preference may comprise that extended reality application processing is to be performed by the terminal, by the apparatus or split between the terminal and the apparatus.

The apparatus may comprise circuitry configured to: receive, from the terminal, a request to indicate whether the apparatus has a subscription capability to subscribe to terminal location notifications from an access and mobility management function; and send, to the terminal, a response including an indication that the apparatus has a subscription capability to subscribe to terminal location notifications from the access and mobility management function.

The apparatus may comprise circuitry configured to: subscribe to terminal location notifications from an access and mobility management function; and send, to the terminal, a message including an indication that the apparatus subscribed to terminal location notifications from the access and mobility management function.

The apparatus may comprise circuitry configured to: receive, from the terminal, a request to modify the service level, wherein the request includes at least one changed terminal capability and/or terminal preference or changed network conditions.

The request to modify the service level may include a suggestion from the terminal to modify the service level.

The apparatus may comprise circuitry configured to: send, to the terminal, a response to the request to modify the service level, wherein the response includes an indication that the suggestion from the terminal to modify the service level has been accepted or refused.

The response to the request to modify the service level may include an alternative suggestion from the apparatus to modify the service level different from the suggestion from the terminal.

The apparatus may comprise circuitry configured to: perform at least one of: determining that the apparatus capability and/or apparatus preference has changed; determining that network conditions has changed; and/or receiving, from an access and mobility management function, a terminal location notification.

The apparatus may comprise circuitry configured to: send, to the terminal, a request to modify the service level.

The request to modify the service level may be sent when at least one of the apparatus capability and/or apparatus preference has changed, network conditions has changed or a terminal location notification is received.

The request to modify the service level may include the changed apparatus capability and/or preference or changed network conditions; and/or the request to modify the service level may include a suggestion from the apparatus to modify the service level.

The apparatus may comprise circuitry configured to: receive, from the terminal, a response to the request to modify the service level, wherein the response to the request to modify the service level includes an indication that the suggestion from the apparatus to modify the service level has been accepted or refused.

The response to the request to modify the service level may include an alternative suggestion from the terminal to modify the service level different from the suggestion from the apparatus.

Extended reality application processing may comprise at least one of rendering, pose tracking, foreground/background segmentation or stitching.

According to an aspect there is provided a method comprising: receiving, from a terminal, a request for a service level of an extended reality application, wherein the request includes an indication of a terminal capability and/or terminal preference; determining a service level based on the terminal capability and/or the terminal preference; and sending, to the terminal, a response to the request for a service level, wherein the service level indicates that extended reality application processing is to be performed by the terminal, by the apparatus or split between the terminal and the apparatus.

The terminal capability may comprise a processing capability and/or a power capability; and/or the terminal preference may comprise that extended reality application processing is to be performed by the terminal, by the apparatus or split between the terminal and the apparatus.

The method may comprise: determining the service level based on an apparatus capability and/or apparatus preference.

Determining the service level may be further based on network conditions, wherein the network conditions comprise at least one of channel quality, delay, outages, queueing status.

The apparatus capability may comprises a processing capability; and/or the apparatus preference may comprise that extended reality application processing is to be performed by the terminal, by the apparatus or split between the terminal and the apparatus.

The apparatus may comprise means for: receiving, from the terminal, a request to indicate whether the apparatus has a subscription capability to subscribe to terminal location notifications from an access and mobility management function; and sending, to the terminal, a response including an indication that the apparatus has a subscription capability to subscribe to terminal location notifications from the access and mobility management function.

The method may comprise: subscribing to terminal location notifications from an access and mobility management function; and sending, to the terminal, a message including an indication that the apparatus subscribed to terminal location notifications from the access and mobility management function.

The method may comprise: receiving, from the terminal, a request to modify the service level, wherein the request includes at least one changed terminal capability and/or terminal preference or changed network conditions.

The request to modify the service level may include a suggestion from the terminal to modify the service level.

The method may comprise: sending, to the terminal, a response to the request to modify the service level, wherein the response includes an indication that the suggestion from the terminal to modify the service level has been accepted or refused.

The response to the request to modify the service level may include an alternative suggestion from the apparatus to modify the service level different from the suggestion from the terminal.

The method may comprise: performing at least one of: determining that the apparatus capability and/or apparatus preference has changed; determining that network conditions has changed; and/or receiving, from an access and mobility management function, a terminal location notification.

The method may comprise: sending, to the terminal, a request to modify the service level.

The request to modify the service level may be sent when at least one of the apparatus capability and/or apparatus preference has changed, network conditions has changed or a terminal location notification is received.

The request to modify the service level may include the changed apparatus capability and/or preference or changed network conditions; and/or the request to modify the service level may include a suggestion from the apparatus to modify the service level.

The method may comprise: receiving, from the terminal, a response to the request to modify the service level, wherein the response to the request to modify the service level includes an indication that the suggestion from the apparatus to modify the service level has been accepted or refused.

The response to the request to modify the service level may include an alternative suggestion from the terminal to modify the service level different from the suggestion from the apparatus.

Extended reality application processing may comprise at least one of rendering, pose tracking, foreground/background segmentation or stitching.

According to an aspect there is provided a computer program comprising computer executable code which when run on at least one processor is configured to: receive, from a terminal, a request for a service level of an extended reality application, wherein the request includes an indication of a terminal capability and/or terminal preference; determine a service level based on the terminal capability and/or the terminal preference; and send, to the terminal, a response to the request for a service level, wherein the service level indicates that extended reality application processing is to be performed by the terminal, by the apparatus or split between the terminal and the apparatus.

The terminal capability may comprise a processing capability and/or a power capability; and/or the terminal preference may comprise that extended reality application processing is to be performed by the terminal, by the apparatus or split between the terminal and the apparatus.

The computer program may comprise computer executable code which when run on at least one processor is configured to: determine the service level based on an apparatus capability and/or apparatus preference.

Determining the service level may be further based on network conditions, wherein the network conditions comprise at least one of channel quality, delay, outages, queueing status.

The apparatus capability may comprises a processing capability; and/or the apparatus preference may comprise that extended reality application processing is to be performed by the terminal, by the apparatus or split between the terminal and the apparatus.

The computer program may comprise computer executable code which when run on at least one processor is configured to: receive, from the terminal, a request to indicate whether the apparatus has a subscription capability to subscribe to terminal location notifications from an access and mobility management function; and send, to the terminal, a response including an indication that the apparatus has a subscription capability to subscribe to terminal location notifications from the access and mobility management function.

The computer program may comprise computer executable code which when run on at least one processor is configured to: subscribe to terminal location notifications from an access and mobility management function; and send, to the terminal, a message including an indication that the apparatus subscribed to terminal location notifications from the access and mobility management function.

The computer program may comprise computer executable code which when run on at least one processor is configured to: receive, from the terminal, a request to modify the service level, wherein the request includes at least one changed terminal capability and/or terminal preference or changed network conditions.

The request to modify the service level may include a suggestion from the terminal to modify the service level.

The computer program may comprise computer executable code which when run on at least one processor is configured to: send, to the terminal, a response to the request to modify the service level, wherein the response includes an indication that the suggestion from the terminal to modify the service level has been accepted or refused.

The response to the request to modify the service level may include an alternative suggestion from the apparatus to modify the service level different from the suggestion from the terminal.

The computer program may comprise computer executable code which when run on at least one processor is configured to: perform at least one of: determining that the apparatus capability and/or apparatus preference has changed; determining that network conditions has changed; and/or receiving, from an access and mobility management function, a terminal location notification.

The computer program may comprise computer executable code which when run on at least one processor is configured to: send, to the terminal, a request to modify the service level.

The request to modify the service level may be sent when at least one of the apparatus capability and/or apparatus preference has changed, network conditions has changed or a terminal location notification is received.

The request to modify the service level may include the changed apparatus capability and/or preference or changed network conditions; and/or the request to modify the service level may include a suggestion from the apparatus to modify the service level.

The computer program may comprise computer executable code which when run on at least one processor is configured to: receive, from the terminal, a response to the request to modify the service level, wherein the response to the request to modify the service level includes an indication that the suggestion from the apparatus to modify the service level has been accepted or refused.

The response to the request to modify the service level may include an alternative suggestion from the terminal to modify the service level different from the suggestion from the apparatus.

Extended reality application processing may comprise at least one of rendering, pose tracking, foreground/background segmentation or stitching.

According to an aspect there is provided an apparatus comprising means for: sending, to an edge cloud, a request for a service level of an extended reality application, wherein the request includes an indication of an apparatus capability and/or apparatus preference; and receiving, from the edge cloud, a response to the request for a service level, wherein the response includes an indication that extended reality application processing is to be performed by the apparatus, by the edge cloud or split between the apparatus and the edge cloud.

The apparatus capability may comprises a processing capability and/or a power capability; and/or the apparatus preference may comprise that extended reality application processing is to be performed by the apparatus, by the edge cloud or split between the apparatus and the edge cloud.

The apparatus may comprise means for: sending, to the edge cloud, a request to indicate whether the edge cloud has a subscription capability to subscribe to apparatus location notifications from an access and mobility management function; and receiving, from the edge cloud, a response including an indication that the edge cloud has a subscription capability to subscribe to apparatus location notifications from the access and mobility management function.

The apparatus may comprise means for: receiving, from the edge cloud, a message including an indication that the edge cloud subscribed to apparatus location notifications from the access and mobility management function.

The apparatus may comprise means for: sending, to the edge cloud, a request to modify the service level, wherein the request includes at least one changed apparatus capability and/or apparatus preference or changed network conditions.

The request to modify the service level may include a suggestion from the apparatus to modify the service level.

The apparatus may comprise means for: receiving, from the edge cloud, a response to the request to modify the service level, wherein the response includes an indication that the suggestion from the apparatus to modify the service level has been accepted or refused.

The response to the request to modify the service level may include an alternative suggestion from the edge cloud to modify the service level different from the suggestion from the apparatus.

The apparatus may comprise means for: receiving, from the edge cloud, a request to modify the service level.

The request to modify the service level may include a changed edge cloud capability and/or change preference or change network conditions; and/or the request to modify the service level may include a suggestion from the edge cloud to modify the service level.

The apparatus may comprise means for: sending, to the edge cloud, a response to the request to modify the service level, wherein the response to the request to modify the service level includes an indication that the suggestion from the edge cloud to modify the service level has been accepted or refused.

The response to the request to modify the service level may include an alternative suggestion from the apparatus to modify the service level different from the suggestion from the edge cloud According to an aspect there is provided an apparatus comprising at least one processor and at least one memory including computer code for one or more programs, the at least one memory and the computer code configured, with the at least one processor, to cause the apparatus at least to: send, to an edge cloud, a request for a service level of an extended reality application, wherein the request includes an indication of an apparatus capability and/or apparatus preference; and receive, from the edge cloud, a response to the request for a service level, wherein the response includes an indication that extended reality application processing is to be performed by the apparatus, by the edge cloud or split between the apparatus and the edge cloud.

The apparatus capability may comprises a processing capability and/or a power capability; and/or the apparatus preference may comprise that extended reality application processing is to be performed by the apparatus, by the edge cloud or split between the apparatus and the edge cloud.

The at least one memory and the computer code may be configured, with the at least one processor, to cause the apparatus at least to: send, to the edge cloud, a request to indicate whether the edge cloud has a subscription capability to subscribe to apparatus location notifications from an access and mobility management function; and receive, from the edge cloud, a response including an indication that the edge cloud has a subscription capability to subscribe to apparatus location notifications from the access and mobility management function.

The at least one memory and the computer code may be configured, with the at least one processor, to cause the apparatus at least to: receive, from the edge cloud, a message including an indication that the edge cloud subscribed to apparatus location notifications from the access and mobility management function.

The at least one memory and the computer code may be configured, with the at least one processor, to cause the apparatus at least to: send, to the edge cloud, a request to modify the service level, wherein the request includes at least one changed apparatus capability and/or apparatus preference or changed network conditions.

The request to modify the service level may include a suggestion from the apparatus to modify the service level.

The at least one memory and the computer code may be configured, with the at least one processor, to cause the apparatus at least to: receive, from the edge cloud, a response to the request to modify the service level, wherein the response includes an indication that the suggestion from the apparatus to modify the service level has been accepted or refused.

The response to the request to modify the service level may include an alternative suggestion from the edge cloud to modify the service level different from the suggestion from the apparatus.

The at least one memory and the computer code may be configured, with the at least one processor, to cause the apparatus at least to: receive, from the edge cloud, a request to modify the service level.

The request to modify the service level may include a changed edge cloud capability and/or change preference or change network conditions; and/or the request to modify the service level may include a suggestion from the edge cloud to modify the service level.

The at least one memory and the computer code may be configured, with the at least one processor, to cause the apparatus at least to: send, to the edge cloud, a response to the request to modify the service level, wherein the response to the request to modify the service level includes an indication that the suggestion from the edge cloud to modify the service level has been accepted or refused.

The response to the request to modify the service level may include an alternative suggestion from the apparatus to modify the service level different from the suggestion from the edge cloud.

According to an aspect there is provided an apparatus comprising circuitry configured to: send, to an edge cloud, a request for a service level of an extended reality application, wherein the request includes an indication of an apparatus capability and/or apparatus preference; and receive, from the edge cloud, a response to the request for a service level, wherein the response includes an indication that extended reality application processing is to be performed by the apparatus, by the edge cloud or split between the apparatus and the edge cloud.

The apparatus capability may comprises a processing capability and/or a power capability; and/or the apparatus preference may comprise that extended reality application processing is to be performed by the apparatus, by the edge cloud or split between the apparatus and the edge cloud.

The apparatus may comprise circuitry configured to: send, to the edge cloud, a request to indicate whether the edge cloud has a subscription capability to subscribe to apparatus location notifications from an access and mobility management function; and receive, from the edge cloud, a response including an indication that the edge cloud has a subscription capability to subscribe to apparatus location notifications from the access and mobility management function.

The apparatus may comprise circuitry configured to: receive, from the edge cloud, a message including an indication that the edge cloud subscribed to apparatus location notifications from the access and mobility management function.

The apparatus may comprise circuitry configured to: send, to the edge cloud, a request to modify the service level, wherein the request includes at least one changed apparatus capability and/or apparatus preference or changed network conditions.

The request to modify the service level may include a suggestion from the apparatus to modify the service level.

The apparatus may comprise circuitry configured to: receive, from the edge cloud, a response to the request to modify the service level, wherein the response includes an indication that the suggestion from the apparatus to modify the service level has been accepted or refused.

The response to the request to modify the service level may include an alternative suggestion from the edge cloud to modify the service level different from the suggestion from the apparatus.

The apparatus may comprise circuitry configured to: receive, from the edge cloud, a request to modify the service level.

The request to modify the service level may include a changed edge cloud capability and/or change preference or change network conditions; and/or the request to modify the service level may include a suggestion from the edge cloud to modify the service level.

The apparatus may comprise circuitry configured to: send, to the edge cloud, a response to the request to modify the service level, wherein the response to the request to modify the service level includes an indication that the suggestion from the edge cloud to modify the service level has been accepted or refused.

The response to the request to modify the service level may include an alternative suggestion from the apparatus to modify the service level different from the suggestion from the edge cloud.

According to an aspect there is provided a method comprising: sending, to an edge cloud, a request for a service level of an extended reality application, wherein the request includes an indication of an apparatus capability and/or apparatus preference; and receiving, from the edge cloud, a response to the request for a service level, wherein the response includes an indication that extended reality application processing is to be performed by the apparatus, by the edge cloud or split between the apparatus and the edge cloud.

The apparatus capability may comprises a processing capability and/or a power capability; and/or the apparatus preference may comprise that extended reality application processing is to be performed by the apparatus, by the edge cloud or split between the apparatus and the edge cloud.

The method may comprise: sending, to the edge cloud, a request to indicate whether the edge cloud has a subscription capability to subscribe to apparatus location notifications from an access and mobility management function; and receiving, from the edge cloud, a response including an indication that the edge cloud has a subscription capability to subscribe to apparatus location notifications from the access and mobility management function.

The method may comprise: receiving, from the edge cloud, a message including an indication that the edge cloud subscribed to apparatus location notifications from the access and mobility management function.

The method may comprise: sending, to the edge cloud, a request to modify the service level, wherein the request includes at least one changed apparatus capability and/or apparatus preference or changed network conditions.

The request to modify the service level may include a suggestion from the apparatus to modify the service level.

The method may comprise: receiving, from the edge cloud, a response to the request to modify the service level, wherein the response includes an indication that the suggestion from the apparatus to modify the service level has been accepted or refused.

The response to the request to modify the service level may include an alternative suggestion from the edge cloud to modify the service level different from the suggestion from the apparatus.

The method may comprise: receiving, from the edge cloud, a request to modify the service level.

The request to modify the service level may include a changed edge cloud capability and/or change preference or change network conditions; and/or the request to modify the service level may include a suggestion from the edge cloud to modify the service level.

The method may comprise: sending, to the edge cloud, a response to the request to modify the service level, wherein the response to the request to modify the service level includes an indication that the suggestion from the edge cloud to modify the service level has been accepted or refused.

The response to the request to modify the service level may include an alternative suggestion from the apparatus to modify the service level different from the suggestion from the edge cloud.

According to an aspect there is provided a computer program comprising computer executable code which when run on at least one processor is configured to: send, to an edge cloud, a request for a service level of an extended reality application, wherein the request includes an indication of an apparatus capability and/or apparatus preference; and receive, from the edge cloud, a response to the request for a service level, wherein the response includes an indication that extended reality application processing is to be performed by the apparatus, by the edge cloud or split between the apparatus and the edge cloud.

The apparatus capability may comprises a processing capability and/or a power capability; and/or the apparatus preference may comprise that extended reality application processing is to be performed by the apparatus, by the edge cloud or split between the apparatus and the edge cloud.

The computer program may comprise computer executable code which when run on at least one processor is configured to: send, to the edge cloud, a request to indicate whether the edge cloud has a subscription capability to subscribe to apparatus location notifications from an access and mobility management function; and receive, from the edge cloud, a response including an indication that the edge cloud has a subscription capability to subscribe to apparatus location notifications from the access and mobility management function.

The computer program may comprise computer executable code which when run on at least one processor is configured to: receive, from the edge cloud, a message including an indication that the edge cloud subscribed to apparatus location notifications from the access and mobility management function.

The computer program may comprise computer executable code which when run on at least one processor is configured to: send, to the edge cloud, a request to modify the service level, wherein the request includes at least one changed apparatus capability and/or apparatus preference or changed network conditions.

The request to modify the service level may include a suggestion from the apparatus to modify the service level.

The computer program may comprise computer executable code which when run on at least one processor is configured to: receive, from the edge cloud, a response to the request to modify the service level, wherein the response includes an indication that the suggestion from the apparatus to modify the service level has been accepted or refused.

The response to the request to modify the service level may include an alternative suggestion from the edge cloud to modify the service level different from the suggestion from the apparatus.

The computer program may comprise computer executable code which when run on at least one processor is configured to: receive, from the edge cloud, a request to modify the service level.

The request to modify the service level may include a changed edge cloud capability and/or change preference or change network conditions; and/or the request to modify the service level may include a suggestion from the edge cloud to modify the service level.

The computer program may comprise computer executable code which when run on at least one processor is configured to: send, to the edge cloud, a response to the request to modify the service level, wherein the response to the request to modify the service level includes an indication that the suggestion from the edge cloud to modify the service level has been accepted or refused.

The response to the request to modify the service level may include an alternative suggestion from the apparatus to modify the service level different from the suggestion from the edge cloud.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

LIST OF ABBREVIATIONS

AF: Application Function
AMF: Access Management Function
API: Application Protocol Interface
AR: Augmented Reality
AS: Application Server
ATW: Asynchronous Time Warping
BS: Base Station
CU: Centralized Unit
DL: Downlink
DNN: Data Network Name
DOF: Degree Of Freedom
DU: Distributed Unit
EAS: Edge Application Server
gNB: gNodeB
GPU: Graphics Processing Units
GSM: Global System for Mobile communication
HMD: Head Mounted Display
HSS: Home Subscriber Server
IoT: Internet of Things
LTE: Long Term Evolution
MAC: Medium Access Control
MR: Mixed Reality
MS: Mobile Station
MTC: Machine Type Communication
NEF: Network Exposure Function
NF: Network Function
NR: New radio
NRF: Network function Repository Function
NSSAI: Network Slice Selection Assistance Information
PDU: Packet Data Unit
RAM: Random Access Memory
(R)AN: (Radio) Access Network
ROM: Read Only Memory
SMF: Session Management Function
NSSAI: Network Slice Selection Assistance Information
TR: Technical Report
TS: Technical Specification
UE: User Equipment
UMTS: Universal Mobile Telecommunication System
VR: Virtual Reality
XR: eXtended Reality
2D: two dimensions
3D: three dimensions
3GPP: $3^{rd}$ Generation Partnership Project
5G: $5^{th}$ Generation
5GC: 5G Core network
5GS: 5G System
5QI: 5G Quality of service Indicator

BRIEF DESCRIPTION OF THE FIGURES

Embodiments will now be described, by way of example only, with reference to the accompanying Figures in which:

FIG. 9 shows a block diagram of a method performed by an edge cloud for processing an extended reality application based on terminal capability and/or preference;

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
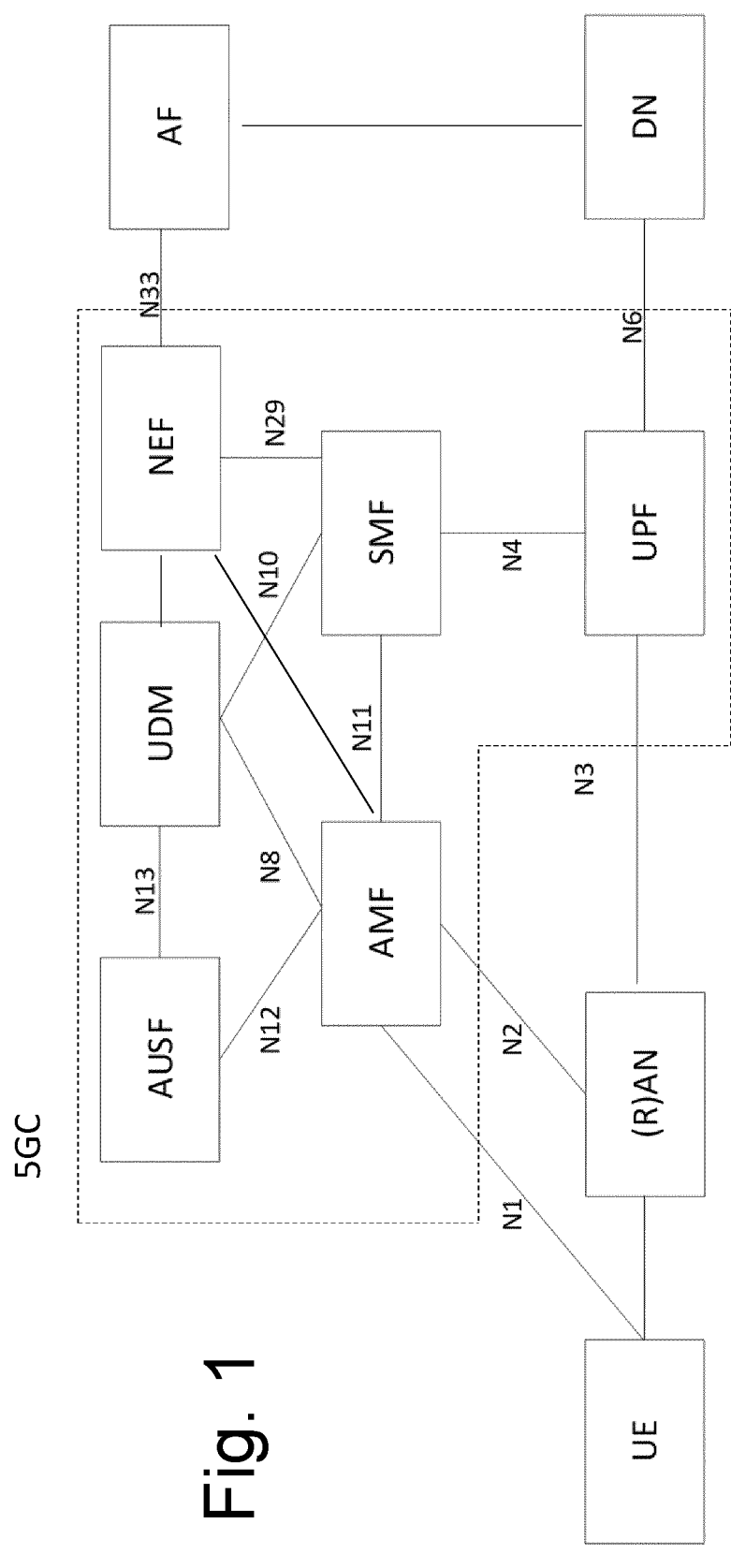
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF). Although not illustrated, the 5GC may comprise other network functions (NF), such as a trusted DN and an extended reality (XR) application provider.

Figure 2:
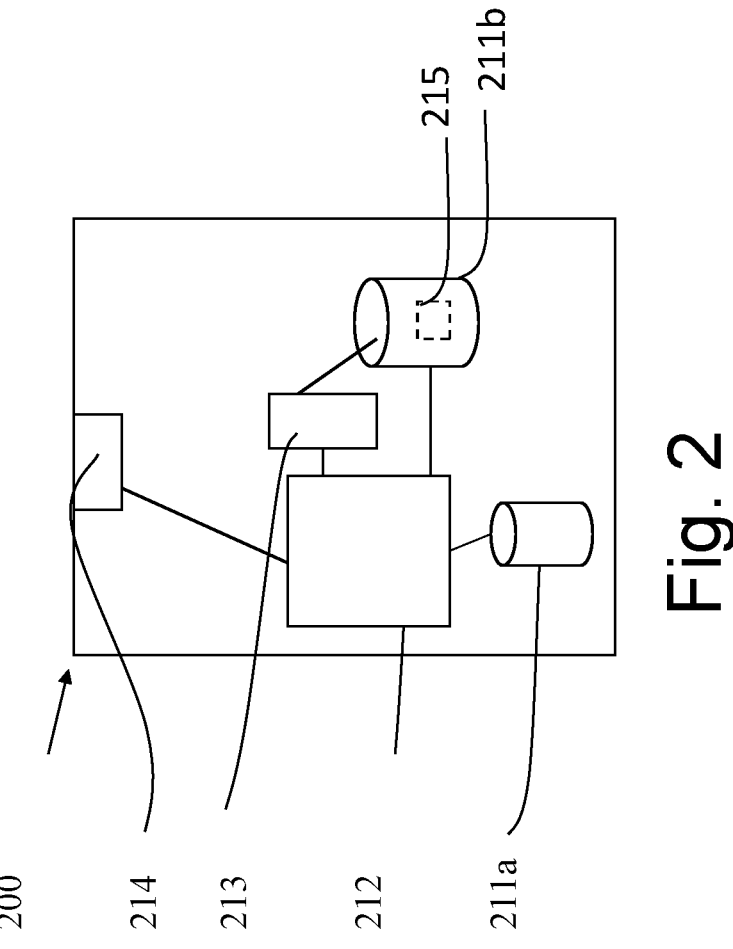
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the 5GC may share a control apparatus.

Figure 3:
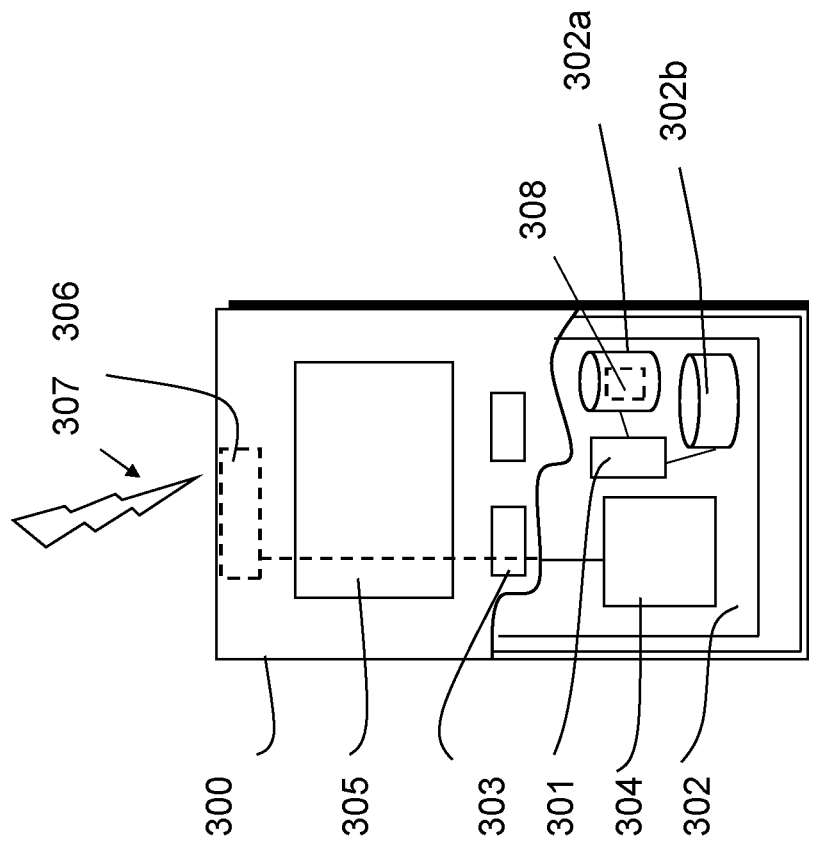
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capability, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 211b. The at least one processor 301 may be configured to execute an appropriate software code 308. The software code 308 may for example allow to perform one or more of the present aspects. The software code 308 may be stored in the ROM 302b.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

XR and Cloud Gaming are some of the most important 5G media applications under consideration in the industry. XR is an umbrella term for different types of realities and refers to all real-and-virtual combined environments and human-machine interactions generated by computer technology and wearables. Different application domains of XR Applications include entertainment, healthcare, education, etc.

In TR 26.928 [1] the terms virtual reality (VR), augmented reality (AR), mixed reality (MR), and XR are defined as follows:

Virtual reality (VR) is a rendered version of a delivered visual and audio scene. The rendering is designed to mimic the visual and audio sensory stimuli of the real world as naturally as possible to an observer or user as they move within the limits defined by the application. Virtual reality usually, but not necessarily, requires a user to wear a head mounted display (HMD), to completely replace the user's field of view with a simulated visual component, and to wear headphones, to provide the user with the accompanying audio. Some form of head and motion tracking of the user in VR is usually also necessary to allow the simulated visual and audio components to be updated in order to ensure that, from the user's perspective, items and sound sources remain consistent with the user's movements. Additional means to interact with the virtual reality simulation may be provided but are not strictly necessary.

Augmented reality (AR) is when a user is provided with additional information or artificially generated items or content overlaid upon their current environment. Such additional information or content will usually be visual and/or audible and their observation of their current environment may be direct, with no intermediate sensing, processing and rendering, or indirect, where their perception of their environment is relayed via sensors and may be enhanced or processed.

Mixed reality (MR) is an advanced form of AR where some virtual elements are inserted into the physical scene with the intent to provide the illusion that these elements are part of the real scene.

Extended reality (XR) refers to all real-and-virtual combined environments and human-machine interactions generated by computer technology and wearables. It includes representative forms such as AR, MR and VR and the areas interpolated among them. The levels of virtuality range from partially sensory inputs to fully immersive VR. A key aspect of XR is the extension of human experiences especially relating to the senses of existence (represented by VR) and the acquisition of cognition (represented by AR).

XR applications may rely on an XR engine. An XR engine may provide a middleware that abstracts the hardware and software functionalities. The XR engine may be a software-development environment designed for building XR experiences such as XR media streaming, games, and other XR applications. The core functionality of the XR engine may be the XR rendering engine for rendering two dimensions (2D) and three dimensions (3D) graphics.

The XR rendering engine may be built upon one or multiple rendering application programming interfaces (APIs) such as Direct3D, OpenGL, or Vulkan. The APIs may provide a software abstraction of the graphics processing unit (GPU). The rendering may be performed according to three different rendering options:

On an XR Device

On an XR Server

On an XR Device and an XR Server (i.e. split rendering—the rendering may be split between the XR server, which is used for the pre-rendering and the XR device for the final rendering).

The rendering option used may depend on the XR device capability, the load on the XR device as well as the XR server and/or current network conditions such as available bandwidth and latency. As an example, raster-based split rendering with pose correction may require a 100 Mbit/s downlink (DL) rate with a delay budget of 20 ms and a 500 kbit/s UL rate with a delay budget of 10 ms.

Figure 4:
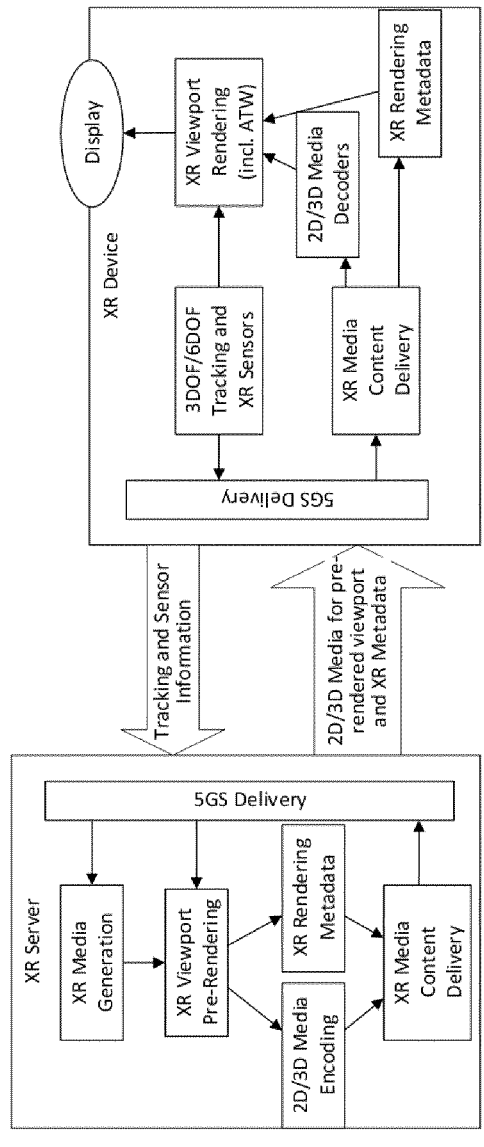
FIG. 4 shows a schematic representation of virtual reality split rendering with extended reality viewport rendering in device.

An example of split rendering is shown on FIG. 4. An XR server may comprise an XR media generation module, an XR view port pre-rendering module, a 2D/3D media encoding module, an XR rendering metadata module, an XR media content module and/or a 5GS delivery module. An XR device may comprise a 5GS delivery module, a 3 degree of freedom (DOF)/6 DOF tracking and XR sensors module, an XR media content delivery module, a 2D/3D media decoders module, an XR rendering metadata module, a XR viewport rendering module and/or a display module. The XR device may provide tracking and sensor information to the XR server. The XR server may provide 2D/3D media for pre-rendered viewport and XR metadata.

The 3DoF may contain pitch, yaw and roll. The 6DoF may further add full translational movement along the x, y, and z axes.

The 3DoF and 6 DoF are Defined in TR 26.928 as:

3DoF: Three rotational and un-limited movements around the X, Y and Z axes (respectively pitch, yaw and roll). A typical use case is a user sitting in a chair looking at 3D 360 VR content on an HMD.

6DoF: 3DoF with full translational movements along X, Y and Z axes. Beyond the 3DoF experience, it adds (i) moving up and down (elevating/heaving); (ii) moving left and right (strafing/swaying); and (iii) moving forward and backward (walking/surging). A typical use case is a user freely walking through 3D 360 VR content (physically or via dedicated user input means) displayed on an HMD.

An XR device may be AR wearable glasses, head mounted displays (HMD), a standard smartphone, a tablet or other. The XR device may be either directly connected to the XR server or the XR server may also be placed in an edge cloud or a central cloud if the latency requirements allow this. For the edge cloud solution, the XR server may be located in a multi-access edge computing (MEC) environment as per ETSI MEC—Multi-access Edge Computing (MEC); Framework and Reference Architecture, in an edge application server (EAS) as per TS 23.558—Architectural Solutions for Enabling Edge Applications or as a spatial computing server (SCS) as per TR 26.928—Extended Reality (XR) in 5G.

Rendering images or videos for presentation on an XR device may require huge computational power and may be time consuming. This may be especially critical for battery-powered devices such as wireless glasses, smartphones, or tablets. On such XR devices only a limited augmentation is possible (e.g. virtual objects with a low number of textures instead of photo-realistic augmentation). Additional limitations of on-device rendering may be on multi-user environments as well as real-time XR experiences. These may be hardly possible without an additional XR server.

In contrast, remote rendering on an XR server may enable to do photo-realistic rendering, multi-user XR gaming experience as well as XR media conferences. The downside of using an XR server may be large delays and bandwidth limitations. Low delays may be required as an application may have to be able to react on fast movements of the person wearing or holding the XR device. If photo-realistic augmentations are to be achieved, the bandwidth requirements may easily go to several 100s of Mbit/s. The delays between the XR server and the XR device may be reduced by placing the XR server close to the XR devices, namely on edge clouds. These edge clouds may also be equipped with GPUs to allow a fast XR rendering.

To cope with the bandwidth and delay limitations, a tight interaction between the XR server, the XR device and the network (e.g. 5GS) may be necessary. Currently, the support from the 5GS is rather limited. For example, the TS 23.501 may only define one 5QI value (80) for all AR applications. The value defines a 10 ms packet delay budget and a $10^{-6}$ packet error rate. Here, more flexible 5QIs may be required for the large range of XR applications and their requirements. This one 5QI value may also hinder to perform split rendering, where both the XR server and the XR device may be sharing the rendering. Here, the latency may be adjustable in the range of 10 ms to several 100 ms and bitrates may be guaranteed. Such requirement has also been identified in TR 26.928.

Hou, Xueshi, Yao Lu, and Sujit Dey, Wireless VR/AR with edge/cloud computing, 2017 26th International Conference on Computer Communication and Networks (ICCCN). IEEE, 2017 analyzed the challenges of VR and AR and presented a remote rendering approach on the edge cloud. To be able to render the content on the edge cloud and transmitting it over a wireless network, they presented various compression methods and a multi-user encoding approach. They focus on remote rendering only and does not show a dynamic rendering between the XR devices and the edge cloud.

TR 26.928—Extended Reality (XR) in 5G presents various possibilities for a split rendering, where the rendering is split between the XR devices and the XR server. Here, the XR server does pre-render the content and the final rendering (e.g. the final viewport rendering is done on the XR device). Although it is shown how the rendering parts are split, the report does not involve any interaction with the 5GS.

US Patent US20120131178A1 presents a multimedia edge cloud, which can be used especially by mobile devices for offloading multimedia processing. Thereby, the network bandwidth is taken into account for deciding on the required compression. Similar to Hou, Xueshi, Yao Lu, and Sujit Dey, Wireless VR/AR with edge/cloud computing, 2017 26th International Conference on Computer Communication and Networks (ICCCN). IEEE, 2017 the approach works on the application layer without involving the underlying network.

TS 22.842—Study on Network Controlled Interactive Services proposes that the NEF may be used to support network capability exposure to the cloud render server as an AF. To compensate the delay induced by the 5GS, an asynchronous time warping (ATW) in the HMD might be used.

As discussed in the previous sections, there may three possibilities for locating the rendering function, on the XR device, on the network on an XR server or split the rendering between the XR device and the XR network. They all have their pros and cons.

Following are some of the criteria that may be taken into account for placing the XR rendering:

XR device capability (e.g. processing capability (e.g. XR APIs, hardware, software), power capability (e.g. power saving needs), etc.);

XR device preference (e.g. on the XR device, on the network on an XR server or split the rendering between the XR device and the XR network);

XR server capability (e.g. processing capability (e.g. load, delay in executing a function (rendering, object recognition), which may exceed the delay of executing the function in the XR device etc.));

XR server preference (e.g. on the XR device, on the network on an XR server or split the rendering between the XR device and the XR network);

Network conditions (channel quality, outages, queueing, etc.); and/or

Application service requirements (e.g. UL/DL bandwidth requirements).

One or more aspects of this disclosure introduce the ability to dynamically determine whether the rendering function is located in the XR device, on the network on a XR server or use a split rendering, in particular at the time of the session establishment. It is also proposed that an edge cloud (i.e. edge application server) may support the capability to host the rendering function.

At the time of session establishment (e.g. packet data unit (PDU) session establishment request) for a given data network name (DNN) and/or network slice selection assistance information (NSSAI) intended for an XR applications, a UE may include UE capability and/or preference in the request.

The network may use the network conditions, the application service requirements, the UE capability and/or preference and/or the network capability and/or preference to determine where the rendering is to be performed. That is, the network may use the network conditions, the application service requirements, the UE capability and/or preference and/or the network capability and/or preference to determine whether the rendering is to be performed by the UE, by the network or by both the UE and the network (split rendering).

The network may host a rendering function in the edge cloud and/or the rendering function may be co-located with the UPF. The network may indicate the chosen option as part of PDU session establishment accept message towards the UE.

The network and/or the UE may perform the rendering based on the negotiated outcome.

At the time of handover or other, re-negotiation may happen again for the session if the network conditions are impacted due to handover.

A re-negotiation may be initiated by the network when the network conditions and/or the network capability and/or preference are impacted (e.g. load on edge cloud, latency or other). A re-negotiation may be initiated by the UE when the network conditions, the application service requirements and/or the UE capability and/or preference are impacted (e.g. battery drop, processing load increases or other).

One or more aspects of this disclosure enable negotiation of XR media composition placement. Network conditions, application service requirements, device capability and/or preference and/or server capability and/or preference may be taken into account in the XR Media Composition placement decision. A 5QI may be flexible depending on changes. Re-negotiation after handover and/or after a change in the network conditions, the application service requirements and/or the UE capability and/or preference may be possible. Renegotiation may be triggered by the UE and/or the network side.

Figure 5:
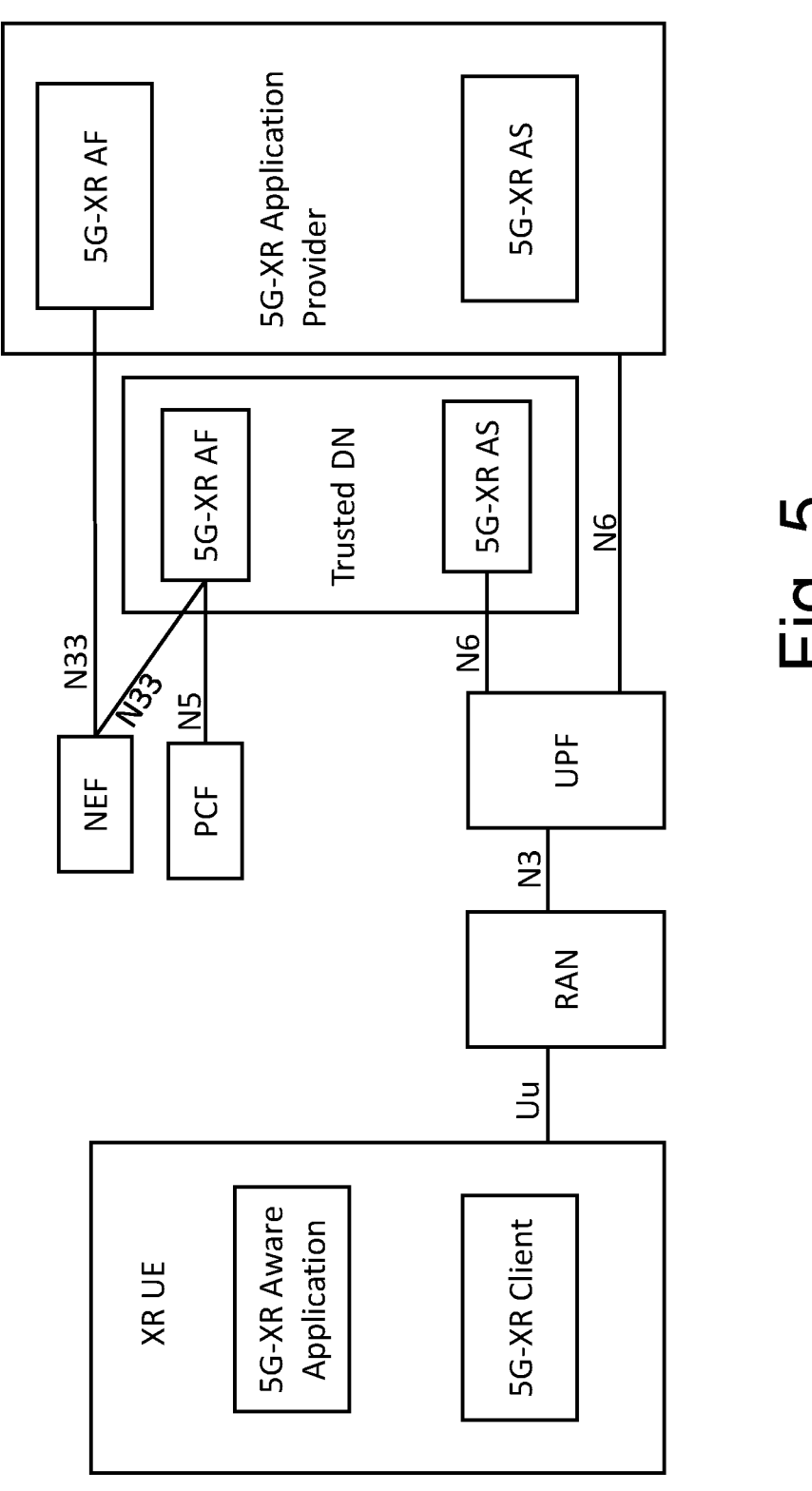
FIG. 5 shows schematic representation of 5G extended reality functions integrated in a 5G System [TR 26.928, FIG. 4.3.2-1]

XR media services may be considered as 5G XR AF. XR media services may be placed either directly in a trusted DN within the 5G-XR application server (AS) or connected via the NEF to the 5GS as illustrated on FIG. 5.

On the client side, a 5G-XR aware application makes use of a 5G-XR client and network functions. The 5G-XR client may comprise an XR session handler and an XR engine. The XR session handler may be a sort of control plane that communicates with the 5G-XR AF to establish, control and support the delivery of an XR session. The XR session handler may expose APIs that can be used by the 5G-XR aware application. The XR engine may communicate with the 5G-XR AS to get access to XR related functionalities like sensors and tracking. The XR engine may process sensors and tracking data and may communicate with the XR session handler for XR session control.

The 5G-XR AS may host a 5G-XR media and media functions. The 5G-XR AF may provide various control functions to the XR session handler on the client side and to the 5G application provider. The 5G-XR AF may relay or initiate a request for different PCF treatment or interact with other network functions.

Figure 6:
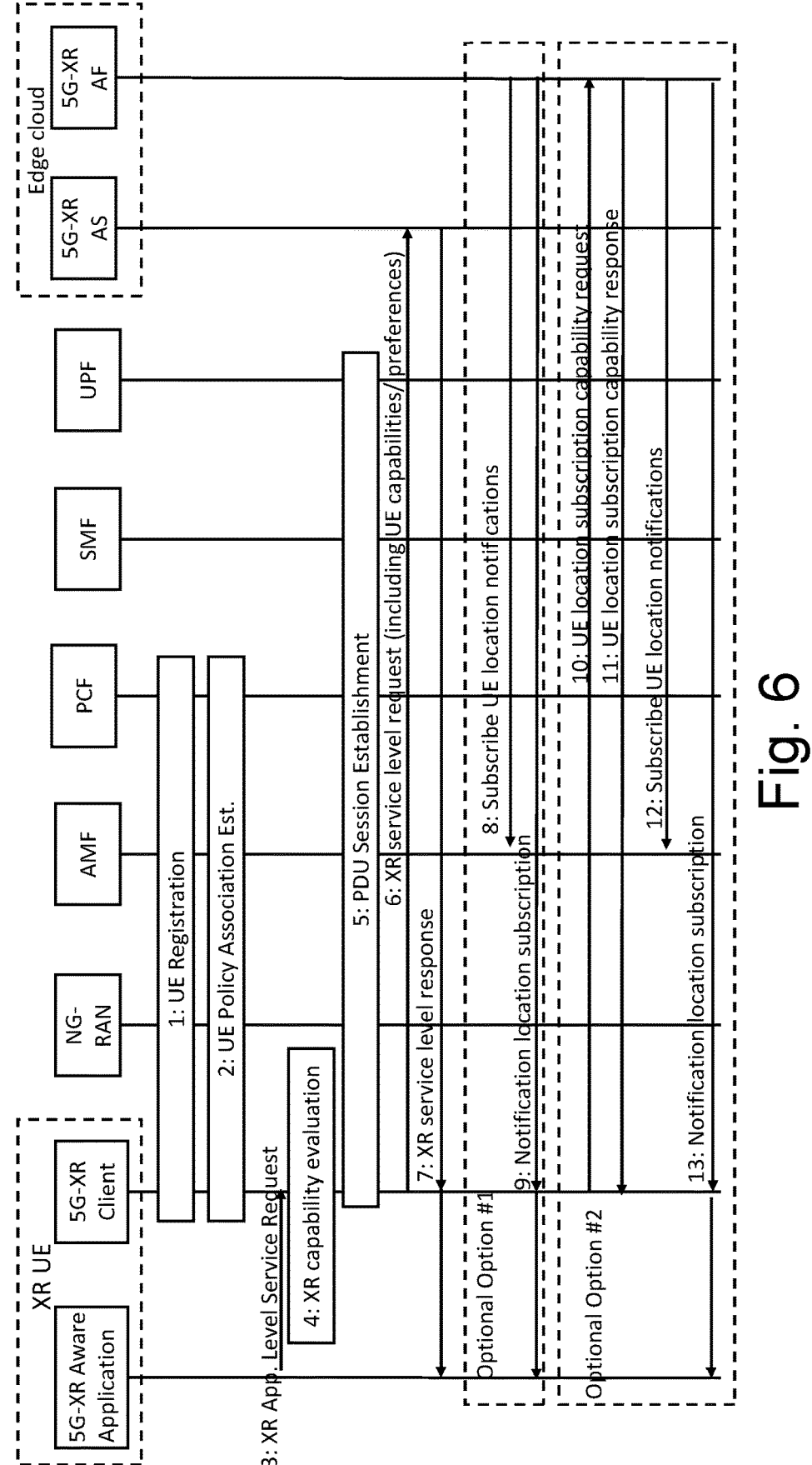
FIG. 6 shows a signalling diagram of a 5G extended reality session establishment process.

FIG. 6 shows a signaling diagram of a 5G XR session establishment process. The session establishment may be based on Rel. 16 TS 23.502 or on any upcoming session establishment process.

An XR UE may comprise a 5G aware application and a 5G XR client. An edge cloud may comprise a 5G XR AS and a 5G XR AF.

In step 1, the 5G XR client may perform initial registration with a 5GC, for example as in TS 23.502 clause 4.2.2.2.2. The 5G XR client of the XR UE may perform initial registration with a PCF.

In step 2, the 5G XR client may perform UE policy association establishment with the 5GC, for example as in TS 23.502 clause 4.16.11. The 5G XR client may perform UE policy association establishment with the PCF.

In step 3, the 5G-XR Aware Application may send a service request to the 5G-XR client with an indication that it wants to start an XR application. The service request may contain one or more XR aware application service requirements such as maximum latency, bandwidth requirements, maximum packet error rate, or other.

In step 4, the 5G XR client may determine XR UE capability and/or preference to perform rendering by the XR UE and/or by the edge cloud. The XR UE capability may comprise processing capability and/or power capability. The processing capability may comprise rendering capability, media processing capability or other. The power capability may comprise a power saving requirement or other.

The XR UE preference may comprise a preference to perform rendering locally by the XR UE, a preference to perform rendering remotely by an edge cloud or a preference to perform rendering locally and remotely by the XR UE and the edge cloud (split rendering).

In step 5, the 5G XR client may perform a PDU session establishment with the 5GC, for example as in TS 23.502 clause 4.3.2. The 5G XR client may perform a PDU session establishment with a UPF. A PDU session establishment message may contain a 5QI value.

In step 6, the 5G XR client may send an XR service level request to a 5G-XR AS via the 5GS. The 5G-XR AS may be hosted in a trusted DN or in an external 5G-XR application provider network as illustrated on FIG. 4. The XR service level request may contain an indication of the XR UE capability and/or preference as evaluated in step 4. The XR service level request may contain an indication of the XR aware application service requirements.

In step 7, the 5G XR AS may determine whether the XR rendering is to be performed by the XR UE, whether the XR rendering is to be performed by the edge cloud or whether the XR rendering is to be performed by the XR UE and the edge cloud (split rendering) based on the XR UE capability and/or preference.

The edge cloud capability may comprise a processing capability. The edge cloud preference may comprise a preference to perform rendering remotely by the edge cloud or a preference to perform rendering locally and remotely by the XR UE and the edge cloud (split rendering).

The 5G XR AS may determine whether the XR rendering is to performed by the XR UE, whether the XR rendering is to be performed by the edge cloud or whether the XR rendering is to be performed by the XR UE and the edge cloud (split rendering) based on network conditions.

The network conditions may comprise a latency, a bandwidth, a bit error rate or other.

The 5G XR AS may determine whether the XR rendering is to performed by the XR UE, whether the XR rendering is to be performed by the edge cloud or whether the XR rendering is to be performed by the XR UE and the edge cloud (split rendering) based on XR aware application service requirements.

For example, the XR rendering may have to be performed by the XR UE because the edge cloud cannot perform the XR rendering due to possible delay requirement violations, overload or missing capability within the edge cloud.

The 5G XR AS may send a XR service level response. The XR service level response may comprise an indication whether the XR rendering is to performed by the XR UE, whether the XR rendering is to be performed by the edge cloud or whether the XR rendering is to be performed by the XR UE and the edge cloud (split rendering).

According to a first option, in step 8 the 5G-XR AF may subscribe to XR UE location notifications with an AMF. The XR UE location notifications may be used to trigger a re-negotiation request (e.g. if certain requirements cannot be fulfilled after a handover).

In step 9, the 5G-XR AF may notify the 5G XR aware application about the location subscription. If the 5G XR aware application knows that the 5G-XR AF is notified, the 5G XR aware application may avoid sending reports related to the connection status.

According to a second option, in step 10 the 5G XR client may ask the 5G-XR AF about its capability to subscribe to location notifications with the AMF.

In step 11, if the 5G XR AF is not able to subscribe to XR UE location notifications with the AMF (e.g. the 5G XR AF is outside the trusted DN or not able to receive the XR UE location notifications via the NEF), the 5G XR AF may inform the 5G XR client by sending a UE location subscription capability response.

In step 12, if the 5G XR AF is able to subscribe to XR UE location notifications with the AMF (e.g. the 5G XR AF is inside the trusted DN or able to receive the notifications via the NEF), the 5G XR AF may subscribe to location notifications with the AMF.

In step 13, the 5G-XR AF may notify the 5G XR aware application about the XR UE location notifications subscription. If the 5G XR aware application knows that the server is notified, the 5G XR aware application may avoid sending reports related to the connection status.

Figure 7:
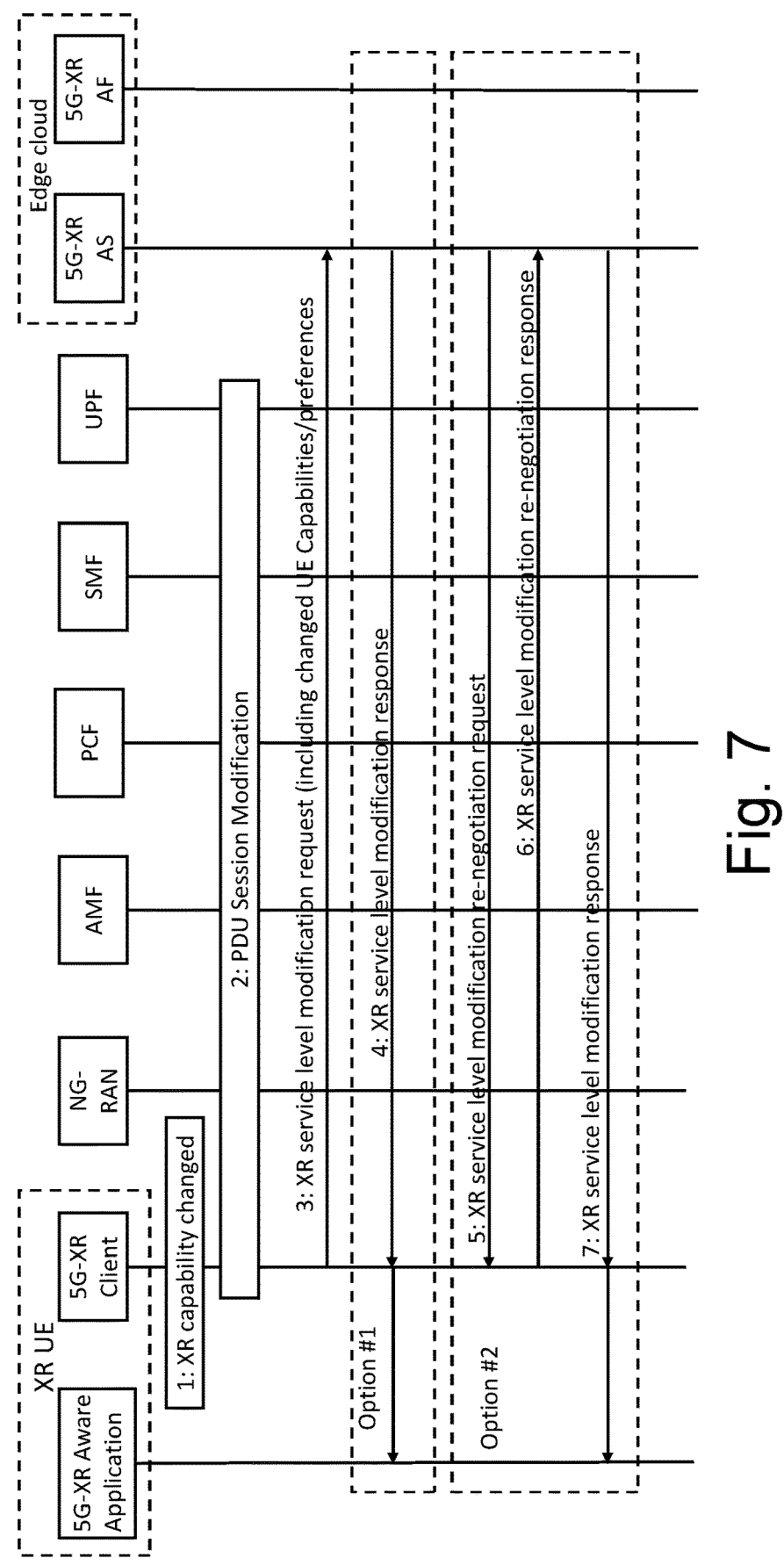
FIG. 7 shows a signalling diagram of a user equipment initiated 5G extended reality session re-negotiation process after changes.

FIG. 7 shows a signalling diagram of a user equipment initiated 5G XR session re-negotiation process after changes.

When conditions based on which the decision to perform XR rendering was made change (e.g. after a handover, when the XR UE is running out of power or other), a re-negotiation may be initiated. This re-negotiation may either be triggered by the XR UE or by the edge cloud. The re-negotiation may be triggered based on XR UE location notifications from the AMF, due to updated quality of service, due to a change in XR UE capability and/or preference, due to a change in edge cloud capability and/or preference, due to a change in network conditions, due to a change in 5G XR aware application service requirements or other.

The change may require a change of the 5QI value. Currently, there is for example just one 5QI value (80) for supporting AR applications. When the 5QI is 80, a packet delay budget of 10 ms is defined as well as a packet error rate of 10-6. With this simple setting, various media streaming services such as split rendering may not be supported. Therefore, flexible 5QIs may be provided, for example addressing differentiated latency requirements in the range of 10 ms to several 100 ms as well as certain bitrate guarantees.

In step 1, the 5G XR client may recognize a change of conditions. In an example, the XR UE enters in a power saving mode and may prefer for the XR rendering to be performed remotely by the edge cloud. In another example, the XR UE may foresee a channel quality drop on the network and may prefer for the XR rendering to be performed locally by the XR UE.

In step 2, the 5G XR client may perform a PDU session modification with the 5GC, for example as in TS 23.502 clause 4.3.3. The 5G XR client may performs the PDU session modification with the UPF. The PDU session modification may incur a change in QoS for the session as the change of XR rendering location can impact QoS for the session.

In step 3, the 5G XR client may send an XR service level modification request to the 5G-XR AS via the 5GS. The 5G-XR AS may be hosted in a trusted DN or in an external 5G-XR application provider as illustrated on FIG. 4. The XR service level modification request may comprise an indication of changed conditions. For example, the XR service level modification request may comprise an indication of the changed XR UE capability and/or preference. The XR service level modification request may comprise a suggestion to modify the performance of the XR rendering. For example, the XR service level modification request may comprise a suggestion to shift the performance of the rendering from the XR UE to the edge cloud.

According to a first option, in step 4 the 5G-XR AS may inform the XR UE whether the XR service level modification request can be fulfilled or not. For example, the 5G-XR AS may inform the XR UE whether a shift of the performance of the rendering from the XR UE to the edge cloud is accepted.

According to a second option, in step 5 the 5G XR AS may not fulfil the XR service level modification request. The 5G XR AS may propose an alternative suggestion to the 5G XR client. For example, the 5G XR AS may propose to perform rendering on the XR UE and the edge cloud (split rendering) or may propose to perform rendering on the XR UE and the edge cloud in a different manner (different split rendering).

In step 6, the 5G XR client may inform the 5G XR AS whether the 5G XR client accepts the alternative suggestion or not.

In step 7, the 5GXR AS may inform the 5G XR aware application about the XR rendering modification. The 5GXR AS may inform the 5G XR aware application about the agreed suggestion and whether the XR rendering is to be performed by the XR UE and/or by the edge cloud.

Figure 8:
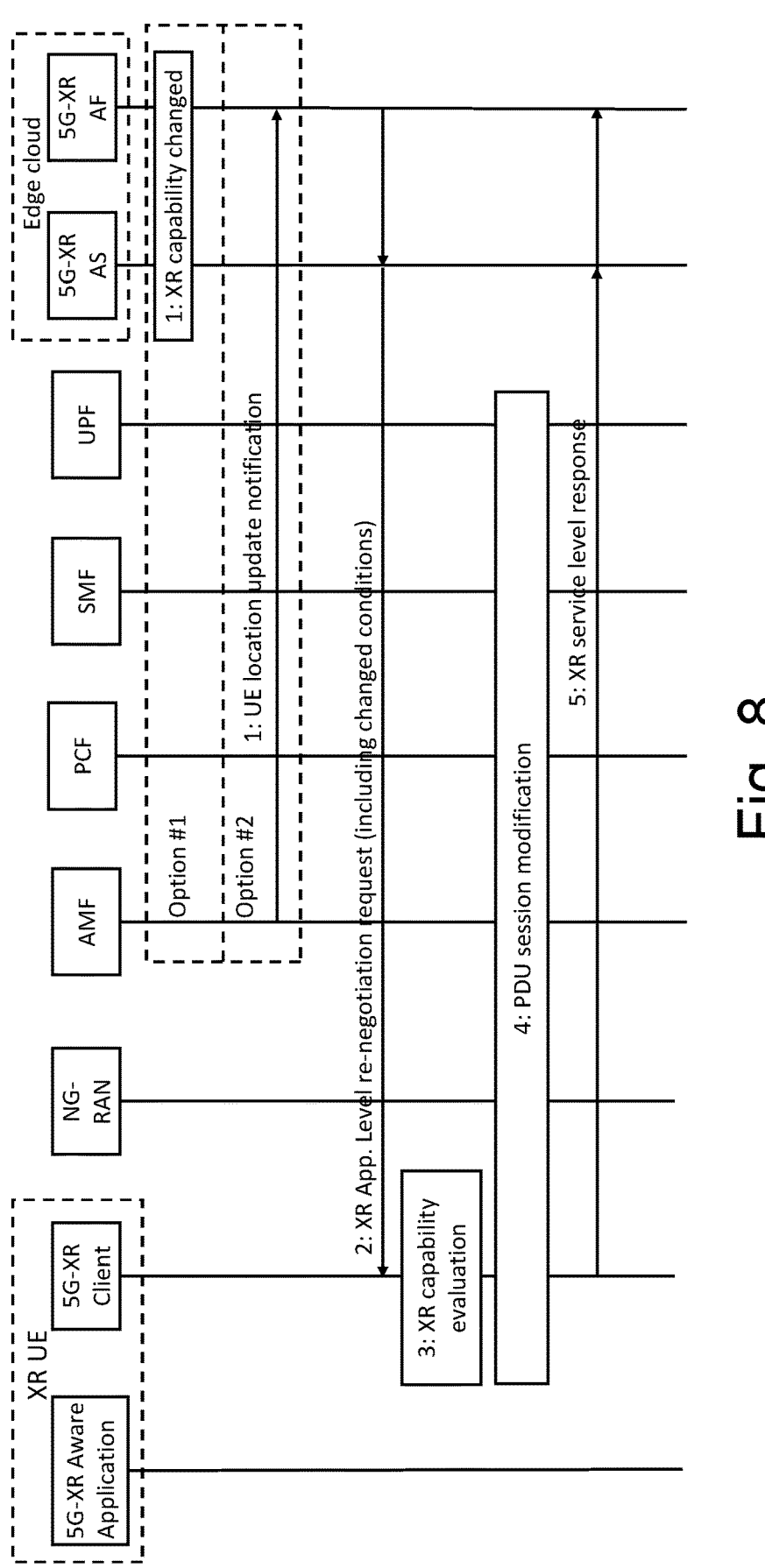
FIG. 8 shows a signalling diagram of an edge cloud initiated 5G extended reality session re-negotiation process after changes.

FIG. 8 shows a signalling diagram of an edge cloud initiated 5G XR session re-negotiation process after changes.

According to a first option, in step 1 the 5G XR AS and/or the 5G XR AF may recognize a change of conditions. For example, the 5G XR AS and/or the 5G XR AF may determine that the edge cloud capability and/or preference have changed. The 5G XR AS and/or the 5G XR AF may determine that the load on the edge cloud has increased and the service level may no longer be guaranteed.

According to a second option, in step 1, the 5G XR AS and/or the 5G XR AF may receive an XR UE location update notification (e.g. after an XR UE handover) from the AMF. This can be an indication that the latency between the XR UE and the edge cloud might get too important for supporting an offloaded media service at the edge cloud.

In step 2, the 5G XR AF may send an XR application level re-negotiation request to the 5G-XR Client. The XR application level re-negotiation request to the 5G-XR Client may comprise an indication of changed conditions. For example, the XR application level re-negotiation request to the 5G-XR Client may comprise an indication of changed edge cloud capability and/or preference. The XR application level re-negotiation request may comprise a suggestion to modify the performance of the XR rendering. For example, the suggestion may be to change from performing XR rendering by the edge cloud to performing rendering by the XR UE and the edge cloud (split rendering).

In step 3, the 5G XR client may determine the XR UE capability and/or preference. The 5G XR client may determine whether the XR application level re-negotiation request can be fulfilled by the XR UE.

In step 4, the 5G XR client may perform a PDU session modification procedure, for example as in TS 23.502 clause 4.3.3. The 5G XR client may perform the PDU session modification procedure with the UPF. The 5G XR client may send a PDU session modification message comprising a changed 5QI value.

In step 5, the 5G XR client may send an XR service level modification response to the 5G-XR AS via the 5GS. The XR service level modification response may comprise an indication whether the XR application level re-negotiation request can be fulfilled or not. For example, the 5G XR client may inform the 5G XR AS whether performing rendering by the XR UE and the edge cloud (split rendering) is accepted.

In an option (not illustrated) the 5G XR client may not fulfil the XR application level re-negotiation request. The 5G XR client may propose an alternative suggestion to the 5G XR AS. For example, the 5G XR client may propose to perform rendering on the XR UE and the edge cloud in a different manner (different split rendering).

The 5G XR AS may inform the 5G XR client whether the 5G XR AS accepts the alternative suggestion or not.

The 5GXR AS may inform the 5G XR aware application about the XR rendering modification. The 5GXR AS may inform the 5G XR aware application about the agreed suggestion and whether the XR rendering is to be performed by the XR UE and/or by the edge cloud.

One or more aspects of this disclosure may provide one or more advantages.

One or more aspects of this disclosure may provide the ability for the 5G XR Client and 5G XR AS to negotiate a configuration for rendering the XR aware application according to (i) XR UE capability and/or preference, (ii) edge cloud capability and/or preference (e.g., remaining power, XR UE hardware and software, edge cloud capacity and load), (iii) network conditions (e.g., e2e latency, traffic load, reliability, etc.) and/or XR aware application service requirements.

One or more aspects of this disclosure may provide the ability for the 5G XR-Client and XR-AS to re-negotiate the configuration for rendering the XR aware application when changes to the system occur. The re-negotiation may be triggered proactively or reactively. For example, by enabling the 5G XR AS to register to UE location notifications, the 5G XR AS can shift the performance of the rendering of the XR aware application from the edge cloud to the XR UE before the XR UE starts the HO procedure.

It will be understood that although one or more aspects of this disclosure relate to rendering, these aspects may be generalised to other types of processing, such as pose tracking, foreground/background segmentation, stitching or other.

FIG. 9 shows a block diagram of a method performed by an edge cloud for processing an XR application based on terminal capability and/or preference.

In step 900, an edge cloud may receive, from a terminal, a request for a service level of an XR application. The service level may indicate that XR application processing is to be performed by the terminal, by the edge cloud or split between the terminal and the edge cloud. XR application processing may comprise at least one of rendering, pose tracking, foreground/background segmentation or stitching.

The request may include an indication of a terminal capability and/or terminal preference. The terminal capability may comprise a processing capability and/or a power capability. The terminal preference may comprise that XR application processing is to be performed by the terminal, by the edge cloud or split between the terminal and the edge cloud.

In step 902, the edge cloud may determine a service level based on the terminal capability and/or the terminal preference.

The edge cloud may determine the service level based on an edge cloud capability and/or edge cloud s preference. The edge cloud capability may comprise a processing capability. The edge cloud preference may comprise that XR application processing is to be performed by the terminal, by the edge cloud or split between the terminal and the edge cloud.

The edge cloud may determine the service level based on network conditions. Network conditions may comprise at least one of channel quality, delay, outages, queueing status.

In step 904, the edge cloud may send, to the terminal, a response to the request for a service level.

The edge cloud may receive, from the terminal, a request to indicate whether the edge cloud has a subscription capability to subscribe to terminal location notifications from an AMF.

The edge cloud may send, to the terminal, a response including an indication that the edge cloud has a subscription capability to subscribe to terminal location notifications from the AMF.

The edge cloud may subscribe to terminal location notifications from the AMF.

The edge cloud may send, to the terminal, a message including an indication that the edge cloud subscribed to terminal location notifications from the access and mobility management function.

In one option, the edge cloud may receive, from the terminal, a request to modify the service level. The request may include at least one changed terminal capability and/or terminal preference or changed network conditions. The request to modify the service level may include a suggestion from the terminal to modify the service level.

The edge cloud may send, to the terminal, a response to the request to modify the service level. The response may include an indication that the suggestion from the terminal to modify the service level has been accepted or refused. The response to the request to modify the service level may include an alternative suggestion from the edge cloud to modify the service level different from the suggestion from the terminal.

In another option, the edge cloud may perform at least one of: determining that the edge cloud capability and/or edge cloud preference has changed; determining that network conditions has changed; and/or receiving, from an access and mobility management function, a terminal location notification.

The edge cloud may send, to the terminal, a request to modify the service level. The request to modify the service level may be sent when at least one of the edge cloud capability and/or edge cloud preference has changed, network conditions has changed or a terminal location notification is received. The request to modify the service level may include the changed edge cloud capability and/or preference or changed network conditions. The request to modify the service level may include a suggestion from the edge cloud to modify the service level.

The edge cloud may receive, from the terminal, a response to the request to modify the service level. The response to the request to modify the service level may include an indication that the suggestion from the edge cloud s to modify the service level has been accepted or refused. The response to the request to modify the service level may include an alternative suggestion from the terminal to modify the service level different from the suggestion from the edge cloud.

Figure 10:
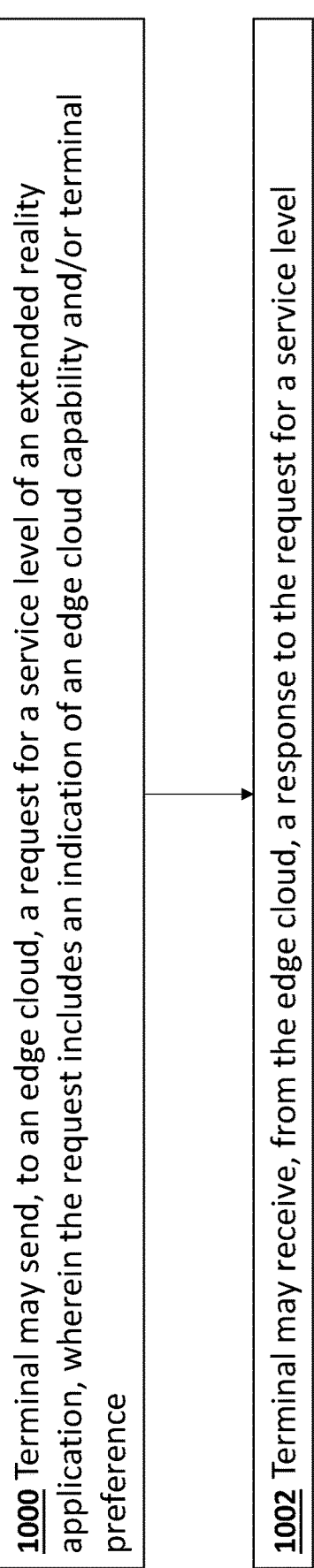
FIG. 10 shows a block diagram of a method performed by a terminal for processing an extended reality application based on the terminal capability and/or preference.

FIG. 10 shows a block diagram of a method performed by a terminal for processing an XR application based on the terminal capability and/or preference.

In step 1000, a terminal may send, to an edge cloud, a request for a service level of an XR application. The service level may indicate that XR application processing is to be performed by the terminal, by the edge cloud or split between the terminal and the edge cloud. XR application processing may comprise at least one of rendering, pose tracking, foreground/background segmentation or stitching.

The request may include an indication of a terminal capability and/or terminal preference. The terminal capability may comprise a processing capability and/or a power capability. The terminal preference may comprise that XR application processing is to be performed by the terminal, by the edge cloud or split between the terminal and the edge cloud.

In step 1002, the terminal may receive, from the edge cloud, a response to the request for a service level. The response includes an indication that extended reality application processing is to be performed by the terminal, by the edge cloud or split between the terminal and the edge cloud.

The terminal may send, to the edge cloud, a request to indicate whether the edge cloud has a subscription capability to subscribe to terminal location notifications from an AMF.

The terminal may receive, from the edge cloud, a response including an indication that the edge cloud has a subscription capability to subscribe to terminal location notifications from the AMF.

The terminal may receive, from the edge cloud, a message including an indication that the edge cloud subscribed to terminal location notifications from the AMF.

In one option, the terminal may send, to the edge cloud, a request to modify the service level. The request may include at least one changed terminal capability and/or terminal preference or changed network conditions. The request may include a suggestion from the terminal to modify the service level.

The terminal may receive, from the edge cloud, a response to the request to modify the service level. The response may include an indication that the suggestion from the terminal to modify the service level has been accepted or refused. The response to the request to modify the service level may include an alternative suggestion from the edge cloud to modify the service level different from the suggestion from the terminal.

In another option, the terminal may receive, from the edge cloud, a request to modify the service level. The request to modify the service level may include a changed edge cloud capability and/or change preference or change network conditions. The request to modify the service level may include a suggestion from the edge cloud to modify the service level.

The terminal may send, to the edge cloud, a response to the request to modify the service level. The response to the request to modify the service level may include an indication that the suggestion from the edge cloud to modify the service level has been accepted or refused. The response to the request to modify the service level may include an alternative suggestion from the terminal to modify the service level different from the suggestion from the edge cloud.

Figure 11:
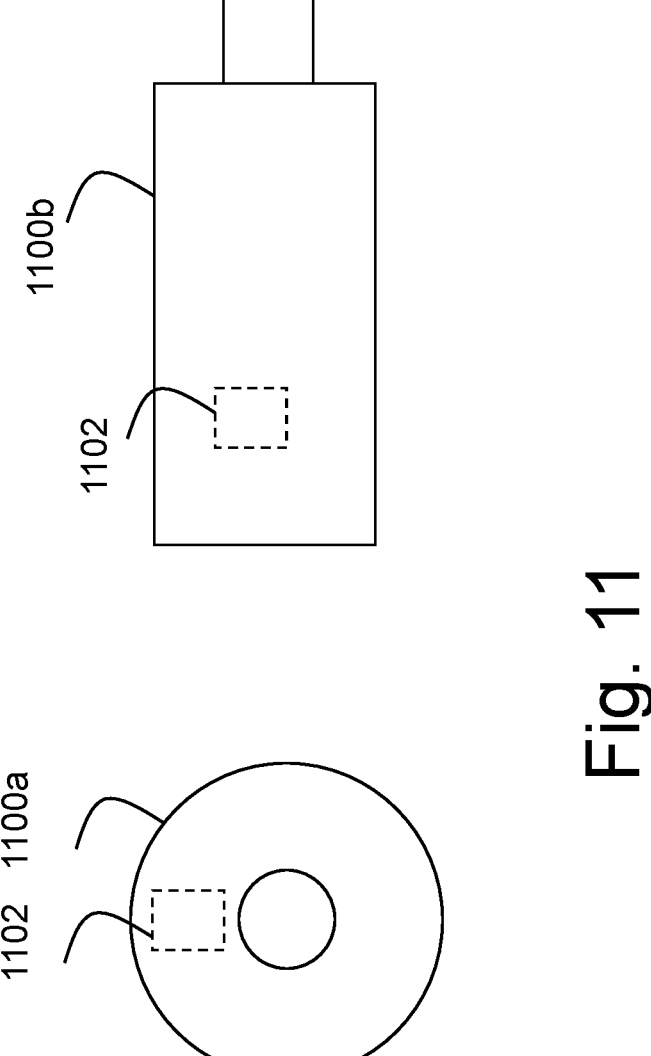
FIG. 11 shows a schematic representation of a non-volatile memory medium storing instructions which when executed by a processor allow a processor to perform one or more of the steps of the methods of FIGS. 9 and 10.

FIG. 11 shows a schematic representation of non-volatile memory media 1100*a* (e.g. computer disc (CD) or digital versatile disc (DVD)) and 1100*b* (e.g. universal serial bus (USB) memory stick) storing instructions and/or parameters 1102 which when executed by a processor allow the processor to perform one or more of the steps of the methods of FIGS. 9 and 10.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

It will also be understood that although the above mechanism has been described as being implemented by a messaging framework, the mechanism may be implemented by another apparatus, entity or function.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIGS. 9 and 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:

at least one processor; and at least one memory including computer code for one or more programs, the at least one memory and the computer code configured, with the at least one processor, to cause the apparatus at least to:

receive, from a terminal, a request for a service level of an extended reality application, wherein the request comprises a terminal capability of the terminal and a terminal preference of the terminal regarding processing of the extended reality application, wherein the terminal capability comprises a processing capability of the terminal and a power capability of the terminal, wherein the terminal preference comprises an indication that processing of the extended reality application is to be split between the terminal and the apparatus;

determine a service level based on the terminal capability and the terminal preference, wherein the service level is determined based on an apparatus capability of the apparatus, an apparatus preference of the apparatus regarding the processing of the extended reality application, and network conditions of a network used to transmit and receive traffic of the extended reality application between the terminal and a server hosting the extended reality application, wherein the apparatus capability of the apparatus comprises a processing capability of the apparatus to process the extended reality application, wherein the apparatus preference comprises an indication that processing of the extended reality application is to be split between the terminal and the apparatus, wherein the network conditions comprise a channel quality of a channel between the terminal and the network, a delay of the network, an indication of outages in the network, and a queueing status of the network;

send, to the terminal, a response to the request for a service level, wherein the service level indicates that processing of the extended reality application is to be split between the terminal and the apparatus;

receive, from the terminal, a request to indicate whether the apparatus has a subscription capability to subscribe to terminal location notifications from an access and mobility management function;

send, to the terminal, a response to the request, the response comprising an indication that the apparatus has a subscription capability to subscribe to terminal location notifications from the access and mobility management function;

subscribe to receive terminal location notifications from the access and mobility management function;

send, to the terminal, a message including an indication that the apparatus subscribed to receive terminal location notifications from the access and mobility management function;

receive, from the terminal, a request to modify the service level, wherein the request to modify the service level comprises a changed terminal capability, a changed terminal preference of the terminal, and a suggestion from the terminal to modify the service level; and send, to the terminal, a response to the request to modify the service level, wherein the response to the request to modify the service level comprises an indication that the suggestion from the terminal to modify the service level has been accepted or refused and an alternative suggestion from the apparatus to modify the service level different from the suggestion from the terminal.

\* \* \* \* \*